United States Patent [19]

Hughes

[11] Patent Number: 5,442,332
[45] Date of Patent: Aug. 15, 1995

[54] VEHICLE INTERFACE SYSTEM AND METHOD

[76] Inventor: Michael T. Hughes, 504 Second St., Berthoud, Colo. 80513

[21] Appl. No.: 20,322

[22] Filed: Feb. 19, 1993

[51] Int. Cl.⁶ .............................................. B60Q 1/50
[52] U.S. Cl. ............................ 340/467; 200/61.45 R;
    200/61.52; 307/10.8; 340/870.29; 340/942;
    340/463; 340/431; 340/429; 340/440
[58] Field of Search ............... 200/61.44, 61.45, 61.51,
    200/61.52; 307/10.8; 340/870.28, 870.29

[56] References Cited

U.S. PATENT DOCUMENTS

| | | | |
|---|---|---|---|
| 3,037,144 | 5/1962 | La Mantia | 250/214 AL |
| 3,740,691 | 6/1973 | Brown | 338/39 |
| 3,882,452 | 5/1975 | Stevens | 340/467 |
| 3,909,075 | 9/1975 | Pittet, Jr. et al. | 303/24 C |
| 3,953,084 | 4/1976 | Pittet, Jr. et al. | 303/24 R |
| 3,967,863 | 7/1976 | Tomecek et al. | 303/24 C |
| 3,981,544 | 9/1976 | Tomecek et al. | 303/21 AF |
| 4,030,756 | 6/1977 | Eden | 303/24 A |
| 4,064,413 | 12/1977 | Andersen | 340/431 |
| 4,233,587 | 11/1980 | Augustine | 338/96 |
| 4,405,190 | 9/1983 | Schroeder | 307/10.8 |
| 4,460,811 | 7/1984 | Murr et al. | 200/51.03 |
| 4,718,853 | 1/1988 | Orbanic | 439/35 |
| 4,721,344 | 1/1988 | Frait et al. | 303/20 |
| 4,770,644 | 9/1988 | Feder | 439/166 |
| 4,781,393 | 11/1988 | Jeter | 280/422 |
| 4,842,524 | 6/1989 | Hopkins et al. | 439/35 |
| 4,846,697 | 7/1989 | Rodgers | 439/35 |
| 5,030,938 | 7/1991 | Bondzeit | 340/431 |
| 5,050,937 | 9/1991 | Eccleston | 303/7 |
| 5,052,951 | 10/1991 | Johnson | 439/723 |
| 5,058,960 | 10/1991 | Eccleston et al. | 303/24.1 |
| 5,184,960 | 2/1993 | Hopkins et al. | 439/35 |

Primary Examiner—John K. Peng
Assistant Examiner—Daryl Christian Pope

[57] ABSTRACT

A self-contained portable interface system (10) coordinates vehicle light response on separate vehicles. A power interface (13) plugs into a cigarette lighter (14) on the first vehicle (16). A turn signal detector (18) releasably engages a turn signal lever arm (22) on the first vehicle (16) for the purpose of detecting actuation of turn signal lights on the first vehicle (16). A flasher switch (25) is disposed on the turn signal detector (18) for concurrently actuating turn signal lights on the second vehicle (12). A control unit (24) communicates via a ribbon cable (42) to the power interface (13) and the turn signal detector (18). The control unit (24) has a light sensing switch (28), which is actuated by atmospheric light, for switching park lights of the second vehicle (12) during the absence of light. An inertia sensor (56) detects deceleration of the first vehicle (16) and causes actuation of brake lights of the second vehicle (12) in response to the deceleration. Finally, a first harness connector (32) interfaces the control unit (24) with a second harness connector (34) of the second vehicle (12).

14 Claims, 8 Drawing Sheets

VEHICLE INTERFACE SYSTEM AND METHOD

FIELD OF THE INVENTION

The present invention generally relates to electrical systems on vehicles, and more particularly, to a vehicle interface system and method for coordinating the response of vehicle lights disposed on separate vehicles.

BACKGROUND OF THE INVENTION

In recent years, the rising popularity of outdoor recreational activities, such as boating and camping, has lead to an increase in the use of trailers, campers, and other towed vehicles. Moreover, many state and federal laws require that towed vehicles, such as trailers, have complete on-board electrical systems for providing, for instance, brake lights, turn signals, and other electrical functionality. These complete on-board electrical systems are usually controlled by the electrical system of the towing vehicle in a master-servant relationship. For example, a driver of the towing vehicle can operate the lights of the towed vehicle by merely controlling the lighting system of the towing vehicle.

Generally, a hard-wired electrical connection is implemented to interface the electrical systems and coordinate the vehicle light response of the separate vehicles. Hard-wired electrical connections are typically implemented via respective wiring harnesses disposed on the vehicles. Each of the wiring harnesses have a harness connector with female and/or male terminals in a pin and/or blade configuration in order to establish an electrical interconnection between the wiring harnesses. The towed vehicle usually comprises an array of male pin terminals for insertion into an array of female pin terminals associated with the wiring harness of the towing vehicle.

Early wiring harnesses comprised relatively simple harness connectors having four terminals arranged in a linear manner and in a flat configuration. Consequently, these four-terminal harness connectors are commonly known as "four-way-flat" harness connectors. Further, the four-way-flat harness connectors were usually sufficient for handling low current requirements of simple electrical systems providing for signal lights, for example, brake lights, park lights, and turn signal lights.

However, trailers, campers, and other towed vehicles have been rapidly evolving and are becoming more sophisticated and larger in size. The newer towed vehicles are equipped with a multitude of more complex accessories, such as electric braking systems, separate air conditioners, stove, and refrigerators. These accessories require higher electrical currents and power, which necessitate heavier and a greater number of interconnections. Today, harness connectors having six or seven wires are becoming increasingly more common on towing vehicles. As a result, in order to conserve space, the terminals in harness connectors are being arranged in circular configurations resulting in a round harness connectors. Examples of round harness connectors include a "six-way- round" harness connector and "seven-way-round" harness connector. Moreover, these harness connectors are being fabricated with pin and/or blade as well as male and/or female terminals.

However, the implementation of more complex harness connectors having a greater number of terminals is problematic. Over eighty five percent (85%) of conventional trailers in use today still use a four-terminal harness connector. This includes the majority of commercial rental trailers, as well as all other trailers and towed vehicles that include only an operating lighting system and none of the aforementioned accessories. Consequently, in order to interface these conventional trailers with the electrical system of a newer towing vehicle, the more complex harness connector of the towing vehicle having a multiplicity of terminals must be replaced, modified, or bypassed in some manner. Furthermore, replacing the more complex harness connector with a simple four-way harness connector is undesirable because the procedure is expensive and permanently prevents future use of the more complex harness connector with a more sophisticated trailer having a cooperating complex harness connector.

In a conventional modification technique, a pinch-type clamp connector is squeezed directly over the wires of the electrical system associated with the towing vehicle. The clamp connector is intended to cut through the insulation of the wires to establish an electrical connection. Over time, however, the clamp connectors can cut through or cause the wires to break, thereby damaging the electrical system and requiring repair.

In a conventional bypass technique, the light covers are first removed from the tail lights of the towing vehicle. Then, electrical connections are made via the light bulb sockets. Needless to say, this juryrigging arrangement is aesthetically unsightly. Further, this arrangement often destroys the water seal around the light covers, which can undesirably lead to damage to the sockets and electrical system. Finally, as the vehicles move through a turn, the wires tend to pull against the lens covers, thereby damaging the lens covers.

Accordingly, a heretofore unaddressed need exists in the industry for a system and method for coordinating the vehicle light response of a towed vehicle, which oftentimes has a simple four-way-flat harness connector, with the vehicle light response of a towing vehicle, which may not have a harness connector or which may have an incompatible harness connector.

SUMMARY OF THE INVENTION

Briefly described, the present invention is an interface system and method for coordinating the response of vehicle lights on a first vehicle with the vehicle lights on a second vehicle, for instance, a vehicle in tow. The interface system comprises generally a light sensing means, a brake detector means, and turn signal detector means. The light sensing means monitors atmospheric light and actuates park lights of the second vehicle during the absence of atmospheric light. The brake detector means detects deceleration of the first vehicle and actuates brake lights of the second vehicle in response to the deceleration of the first vehicle. The turn signal detector means detects an actuation of a turn signal light on the first vehicle and actuates a corresponding turn signal light on the second vehicle in response to the actuation. In addition, the interface system may comprise a flasher means for concurrently actuating both turn signal lights on the second vehicle. In this regard, the flasher means has a manually-operated switch in the first vehicle for causing actuation of both turn signals in the second vehicle.

The present invention also provides for a novel inertia sensor and method for detecting actuation of brakes on a vehicle. The inertia sensor comprises a pair of arcuate rails, a mobile conductive mass resting on and electrically connecting the rails and capable of moving on the rails in response to inertia, and a processing means for monitoring resistance between said rails. The processing means indicates actuation of the brakes upon a predetermined change in the resistance. As a consequence of the novel inertia sensor, brake actuation can be accurately and efficiently detected without directly monitoring the brake status or associated electrical circuitry and hydraulic apparatus. In addition, the inertia sensor may be used to automatically control electric brakes on the second vehicle.

Thus, an object of the present invention is to overcome the problems of the prior art as described above in the background section.

Another object of the present invention is to provide a system and method for automatically coordinating the vehicle light response of two separate vehicles.

Another object of the present invention is to provide a system and method for coordinating the vehicle light response of a towed vehicle, which may have for example a four-way flat harness connector, with the vehicle light response of a towing vehicle, which may not have a harness connector or may have an incompatible harness connector.

Another object of the present invention is to provide a system and method for quickly and easily interfacing the vehicle light response of separate vehicles.

Another object of the present invention is to provide a self-contained portable system for coordinating the vehicle light response of separate vehicles.

Another object of the present invention is to provide an interface system which is simple in design, inexpensive to manufacture, easy to implement, and reliable as well as efficient in operation.

Other objects, features, and advantages of the present invention will become apparent from the following detailed description when taken into conjunction with the accompanying drawings in which like characters of reference designate corresponding parts throughout the several views.

BRIEF DESCRIPTION OF THE DRAWINGS

The present invention, as defined in the claims, can be better understood with reference to the following drawings. The drawings are not necessarily to scale, emphasis instead being placed upon clearly illustrating principals of the present invention.

DETAILED DESCRIPTION OF THE PREFERRED EMBODIMENT

Figure 1:
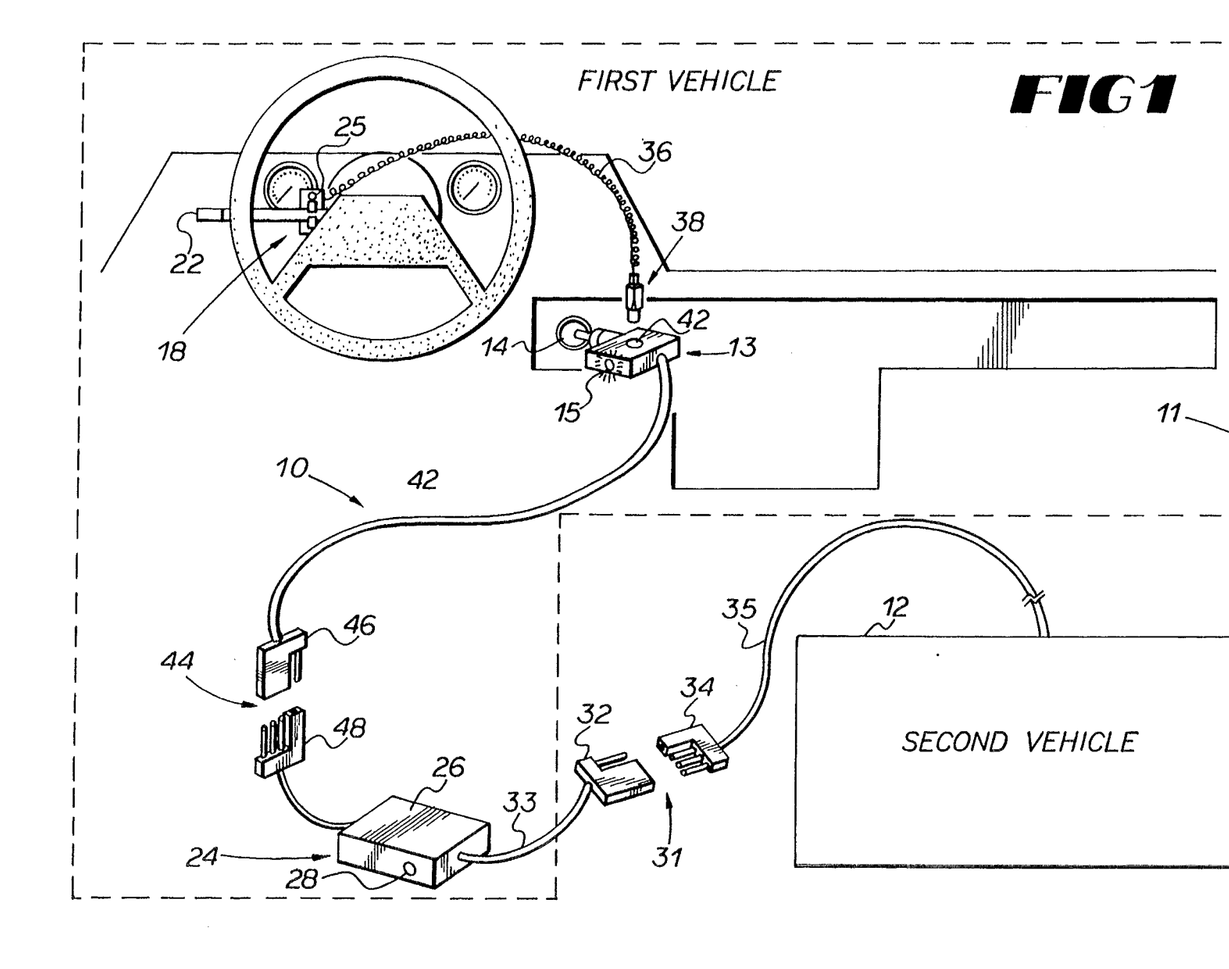
FIG. 1 is a schematic view of a novel interface system in accordance with the present invention.

Referring now to the drawings wherein like reference numerals indicate corresponding parts throughout the several views, FIG. 1 illustrates a self-contained, portable, user friendly interface system 10 in accordance with the present invention for automatically coordinating vehicle light response on separate first and second vehicles 11, 12. Generally, the interface system 10 has a power interface 13 for detachably interfacing with an electrical power source, for example, a cigarette lighter socket 14, on the first vehicle 16, a turn signal detector 18 connected to the power source 14 and configured to releasably attach to a turn signal lever 22 of the first vehicle 11 for the purpose of detecting actuation of either a right or a left turn signal light on the first vehicle 11, and a control unit 24 connected to the power interface 13 and communicating with the second vehicle 12. The control unit 24 can be mounted anywhere, such as on either vehicle 11, 12. The control unit 24 is preferably equipped with a durable sealed rectangular housing 26 made of a hard plastic, aluminum, or other suitable material, and may be provided with a magnetic mount or other suitable mounting mechanism. Hence, because of the foregoing quick-connect/disconnect attributes, the interface system 10 is easily and quickly installed in and removed from the first vehicle 11.

The turn signal detector 18 can also be provided with a flasher switch 25 for concurrently actuating both turn signal lights on the second vehicle 12. In the preferred embodiment, the flasher switch 25 is a conventional manually-operated pushbutton style switch.

A light sensing switch 28, preferably incorporating a photocell sensor, is situated in the control unit 24 and is exposed to the atmosphere. The light sensing switch 28 is configured to actuate park lights of the second vehicle 12 during the absence of atmospheric light.

Significantly, the control unit 24 has a novel inertia sensor 56 (first embodiment 56a in FIG. 3A, 3B; second embodiment 56b in FIG. 4A, 4B) configured to detect deceleration of the first vehicle 11. Detection of deceleration of the first vehicle 11 enables actuation of brake lights of the second vehicle 12.

The control unit 24 further comprises a control unit processing circuit 19 (FIGS. 4 and 4B) for monitoring the turn signal detector 18 and the flasher switch 25. The processing circuit 19 actuates corresponding turn signal lights on the second vehicle 12.

A harness connector 32, for example, a four-way flat, four-way-round, six-way-round, or seven-way-round connector, may be connected to the control unit 24 via a flexible connecting cord 33 for the purpose of easily and quickly interfacing the control unit 24 with a correlative harness connector 34, for example, a four-way-flat, four-way-round, six-way-round, or seven-way-round connector, respectively, on the harness 35 of the second vehicle 12. The harness connector 34 has connections to the park lights, the brake lights, and the turn signal lights of the second vehicle 12.

As further shown in FIG. 1, the power interface 13 may be provided with an indicator 15, such as a light emitting diode (LED), for indicating operation of any light on the second vehicle 12, such as the park lights, the brake lights, or turn signal lights of the second vehicle 12.

Removable electrical connections further enhance the versatility, portability, and maintenance of the interface system 10. In this regard, the turn signal detector 18 has a flexible, spiraling, connecting cord 36 with a male pin-like connecting jack 38 at its end for detachably engaging a correlative female pin-like socket 42 disposed on the power interface 13 in order to permit easy and detachable electrical interfacing of the turn signal detector 18 and the power interface 13. Further, the power interface 13 is connected to the control unit 24 via a flexible multi-wire ribbon cable 42 and a detachable connector arrangement 44. The detachable connector arrangement 44 preferably comprises correlative four-way flat connectors 46, 48 connected in mating engagement for enabling easy detachment of the control unit 24 from the remainder of the interface system 10.

Figure 2A:
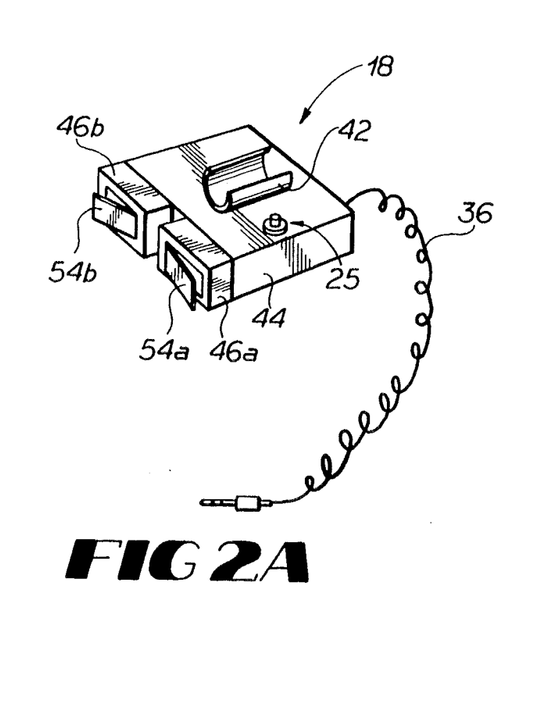
FIG. 2A is a perspective view of a turn signal detector of FIG. 1.
Figure 2B:
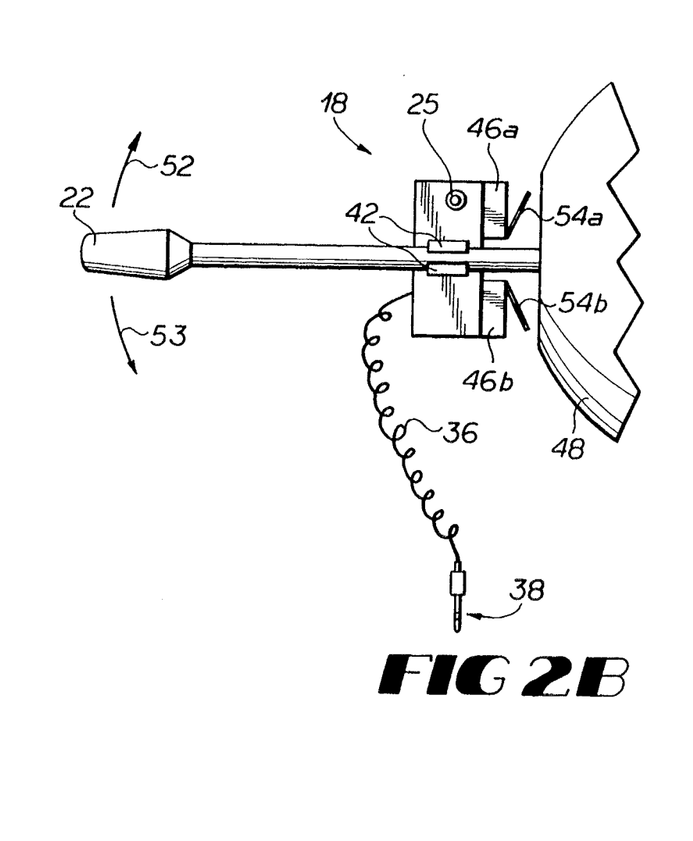
FIG. 2B is a side rear view of the turn signal detector of FIG. 2A.

The turn signal detector 18 is shown in FIGS. 2A and 2B. As shown in FIG. 2A, the turn signal detector 18 has an elongated C-shaped clamp 42 secured to a rectangular housing 44 of the turn signal detector 18. The elongated C-shaped clamp 42 wraps tightly around the turn signal lever 22 of the first vehicle 11 in order to firmly secure rocker arm switches 46a, 46b in close proximity to a steering column 48 of the first vehicle 11.

As illustrated in FIG. 2B, as the turn signal lever arm 22 is moved upwardly, as indicated by a directional arrow 52, the contact 54a of the rocker arm switch 46a engages and is depressed by the upper portion of the steering column 48. Moreover, when the turn signal lever arm 22 is moved downwardly in the direction indicated by a directional arrow 53, the contact 54b of the rocker arm switch 46b is engaged and depressed by the lower portion of the steering column 48.

It should be mentioned that the turn signal detector 18 may be easily designed, as is well known to those skilled in the art, so that the turn signal detector 18 communicates to the control unit 26 via wireless communication, such as radio frequency (RF) or infrared (IR). Hence, connecting cord 36 may be eliminated if wireless communication is implemented.

Figures 3A, 3B:
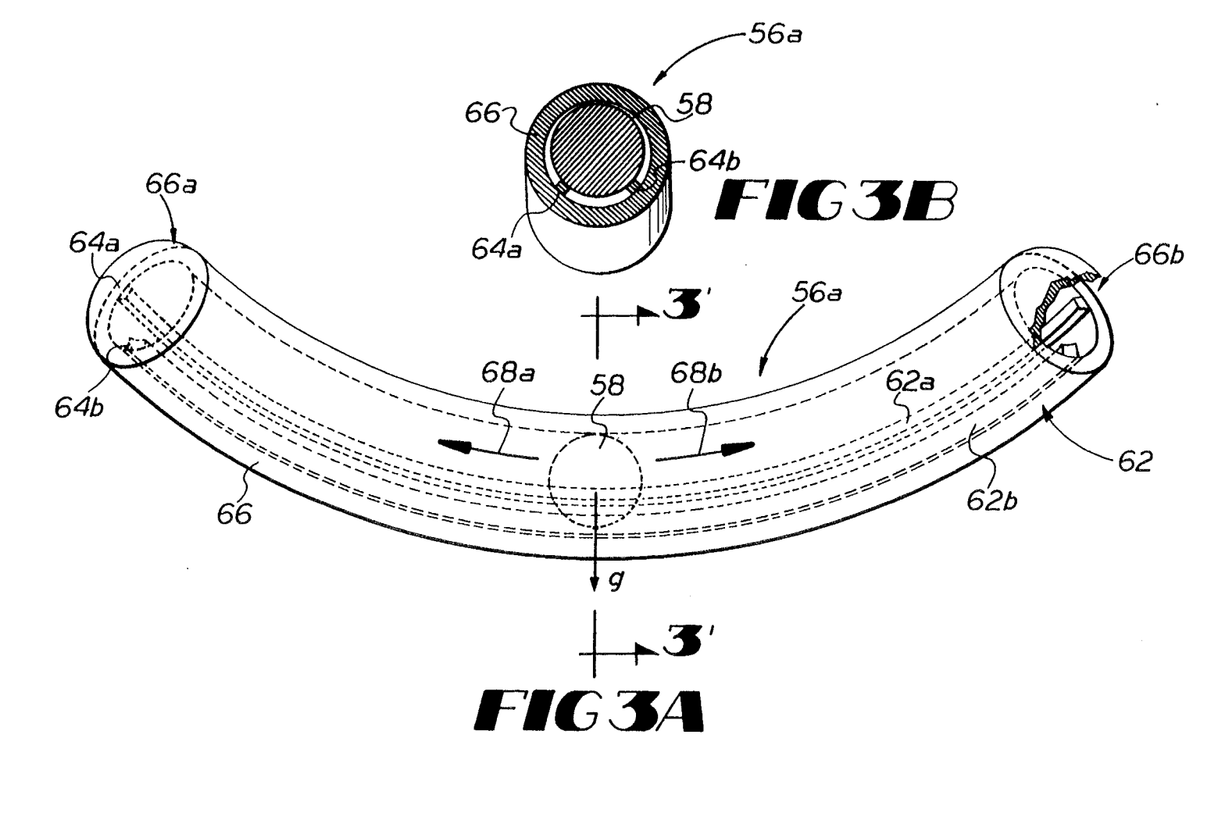
FIG. 3A is a perspective view of a first embodiment of an inertia sensor for the control unit of FIG. 1.
FIG. 3B is a cross sectional view of the inertia sensor of FIG. 3A taken along line 3'—3'.

A first embodiment 56a of the inertia sensor 56 is illustrated in FIGS. 3A and 3B. As illustrated in FIGS. 3A and 3B, the first embodiment 56a of the inertia sensor 56 has a conductive mass 58, for instance, a mercury bead, riding on and electrically connecting arcuate rails 62a, 62b forming an arcuate track 62. The conductive mass 58 rests on the track 62 by force of gravity g and is movable along the track 62 by inertia and forces imposed on the mercury bead 58 by movement of the first vehicle 11. In the preferred embodiment, the rail 62a is made of a semiconductor material, such as carbon or nychrome, and the rail 62b is made of a conductor material, or perhaps, a semiconductor material. Further, each of the rails 62a, 62b comprises a corresponding connecting lead 64a, 64b disposed at the exterior of a sealed housing 66 of the inertia sensor 56. Preferably, the housing 66 is a rigid arcuate cylindrical shape and is made of any suitable material, for example, plastic, nylon, or other material capable of forming a rigid sealed enclosure. The housing 66 may be mounted by any suitable mounting means within the control unit 24.

In essence, the resistance between the rails 62a, 62b is monitored by the control unit 24 in order to determine the location of the mass 58. The rate of change of the resistance, and hence location of the mass 58, is monitored in order to determine when the first vehicle 11 is braking. The support circuitry for the inertia sensor 56, i.e., the brake detector circuit 72a (FIGS. 5A), filters out slow changes in the track resistance to eliminate false triggering of the brake lights on the second vehicle 12 when the vehicles 11, 12 travel up and down hills or the like. Furthermore, as the first vehicle 11 is jarred during travel, the surface tension of the mass 58 prevents subtle changes in the rail resistance 62 and hence false readings. Operation of the inertia sensor 56 is described hereafter.

When the first vehicle 11 is stationary or moving at a constant velocity, the mass 58 rests substantially stationary on the arcuate track 62 under the force of gravity g. If the first vehicle 11 is traveling on a substantially horizontal road, then the mass 58 will rest near the central portion of the track 62, as illustrated in FIG. 3A. However, if the first vehicle 11 is traveling on an upgrade or downgrade, then the mass 58 will rest somewhere off center of the track 62. The brake detector circuit 72a (FIGS. 5A) monitors the position of the mass 58 and does not indicate a braking occurrence unless a sudden forward displacement of the mass 58 occurs.

When the vehicle 11 begins to brake, the mass 58 quickly progresses forwardly toward the end 66a, as indicated by a directional arrow 68a. As the mass 58 moves in the direction indicated by the directional arrow 68a, the resistance between the rails 62a, 62b as measured at the rail leads 64a, 64b, begins to decrease quickly, thereby indicating a braking occurrence.

When the first vehicle 11 begins to accelerate after stopping or during travel, the mass 58 moves rearwardly, as indicated by the directional arrow 68b, to thereby increase the resistance between the rails 62a, 62b as measured at respective rail leads 64a, 64b. In this event, the control unit 24 turns off the brake lights on the second vehicle 12.

Figure 4A:
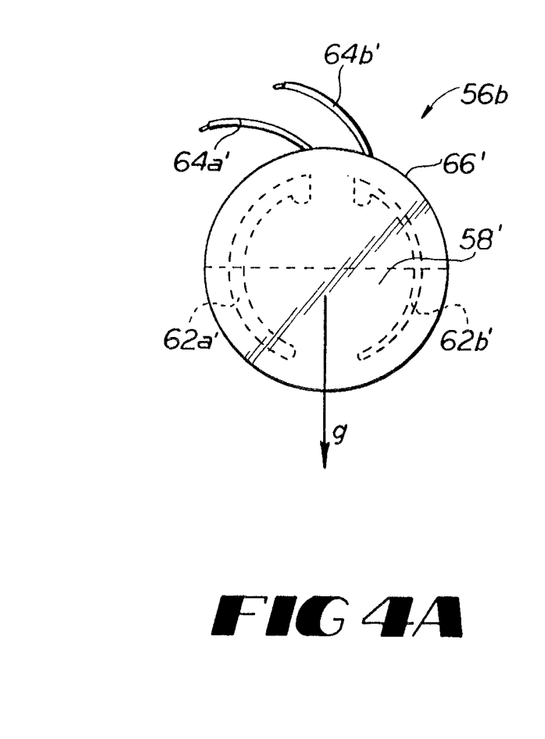
FIG. 4A is a front view of a second embodiment of an inertia sensor for the control unit of FIG. 1.
Figure 4B:
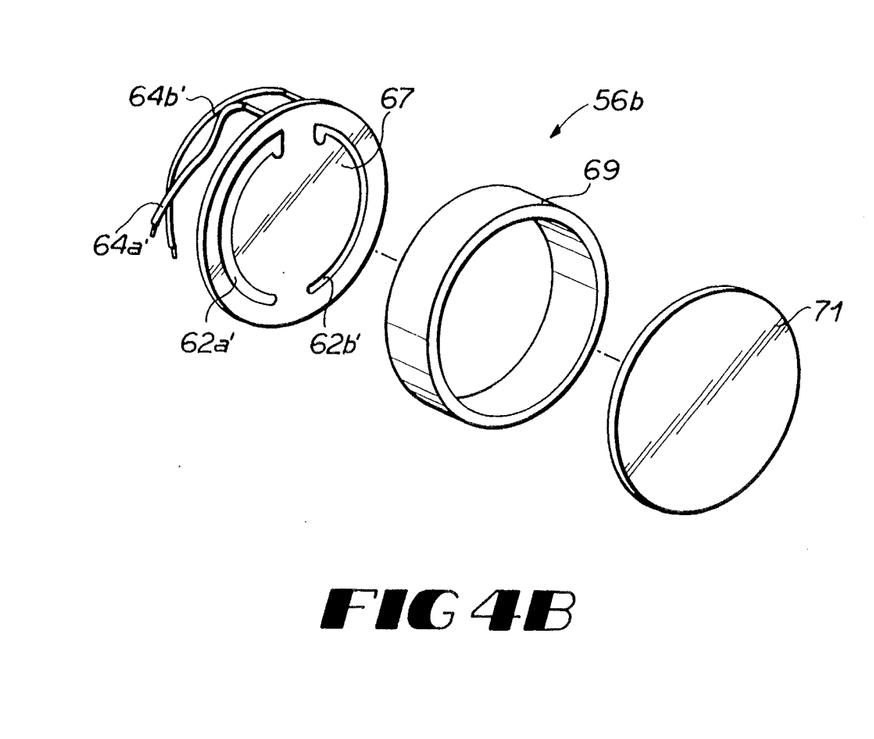
FIG. 4B is an assembly view of the inertia sensor of FIG. 4A.

A second embodiment 56b of the inertia sensor 56 is illustrated in FIGS. 4A and 4B. As illustrated in FIGS. 4A and 4B, the second embodiment 56b has a rigid, sealed, circular housing 66', which is situated upright during operation as shown in FIG. 4A, with a conductive mass 58', for instance, a mercury bead or body, riding against and electrically connecting spaced, opposing, arcuate rails 62a', 62b'. The conductive mass 58' rests and rides near the bottom of the housing 66' by downward force of gravity g and is movable along within the housing 66' by inertia and forces imposed on the conductive mass 58' by movement of the first vehicle 11.

The housing 66' is made of any suitable material, for example, plastic, nylon, or other material capable of forming a rigid sealed circular enclosure, and the housing 66' may be mounted by any suitable mounting means within the control unit 24. In the preferred embodiment, the housing 66' is fabricated with three pieces, as shown in FIG. 4B. The rails 62a', 62b' are preferably printed onto a generally flat circular printed circuit board 67, which constitutes an end piece of the housing 66'. The rail 62a' is made of a semiconductor material, such as carbon or nychrome, and the rail 62b' is made of a conductor material, or perhaps, a semiconductor material. Further, the rails 62a', 62b' on board 67 are enclosed via a cylindrical spacer ring 69 and another generally flat circular end piece 71, which may be another printed circuit board with or without other resistive or conductive traces in contact with the conductive mass 58'.

Finally, as shown in FIGS. 4A and 4B, each of the rails 62a', 62b' comprises a corresponding connecting lead 64a', 64b' disposed at the exterior of the sealed housing 66'.

In operation, the resistance between the rails 62a', 62b' of the second embodiment 56b is monitored by the control unit 24 in order to determine the location of the mass 58', just as in the first embodiment 56a. The rate of change of the resistance, and hence location of the mass 58' relative to rails 62a', 62b' is monitored in order to determine when the first vehicle 11 is braking. Support circuitry for the second embodiment 56b of the inertia sensor 56, i.e., the brake detector circuit 72a (FIGS. 5A), filters out slow changes in the track resistance to eliminate false triggering of the brake lights on the second vehicle 12 when the vehicles 11, 12 travel up and down hills or the like. Furthermore, as the first vehicle 11 is jarred during travel, the surface tension of the mass 58 and configuration of rails 62a', 62b' prevents subtle changes in the inter-rail resistance and hence false readings.

In addition, the first and second embodiments 56a, 56b of the inertia sensor 56 may be used to automatically actuate electric brakes on the second vehicle 12. The intensity Of the braking applied is in direct proportion to the shift in the rail resistance. Further, connection to the electric brakes may be effectuated via the connecting arrangement 31.

Figure 5:
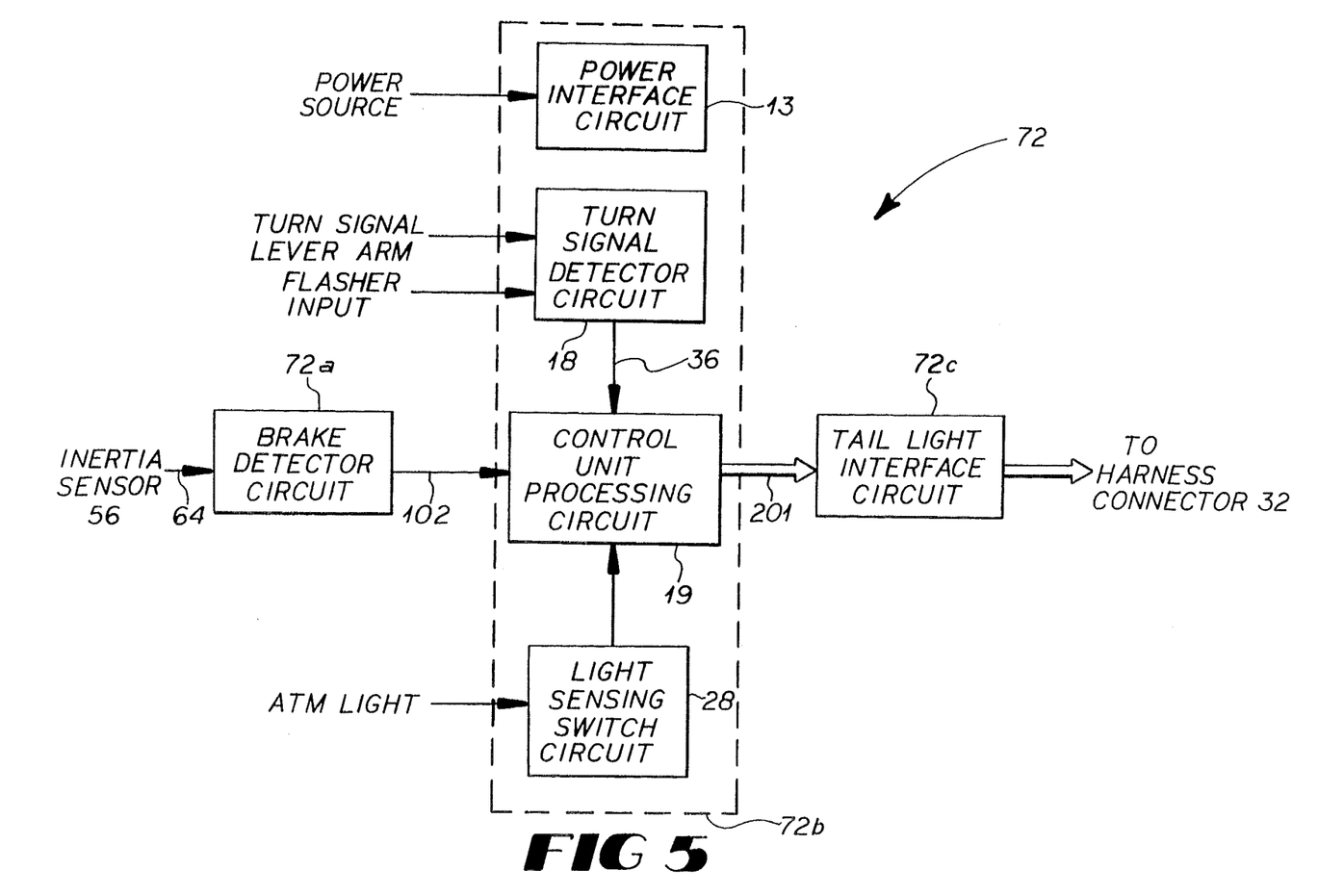
FIG. 5 is a high level circuit diagram which combines the circuit diagrams of FIGS. 5A through 5C described hereafter and which shows the internal circuits of the control unit of FIG. 1.
Figure 5A:
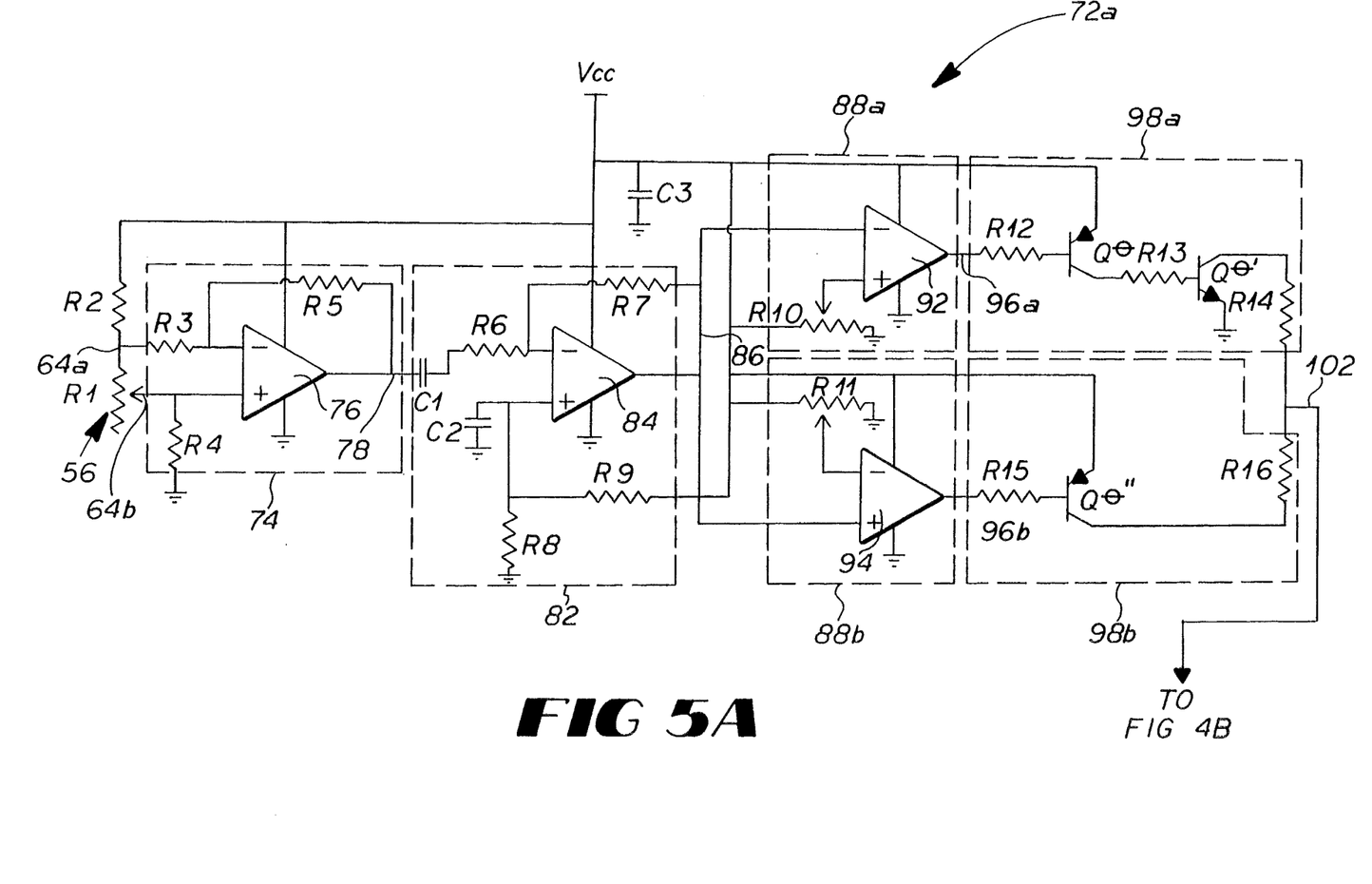
FIG. 5A is a low level circuit diagram of a brake detector circuit of FIG. 5.
Figure 5B:
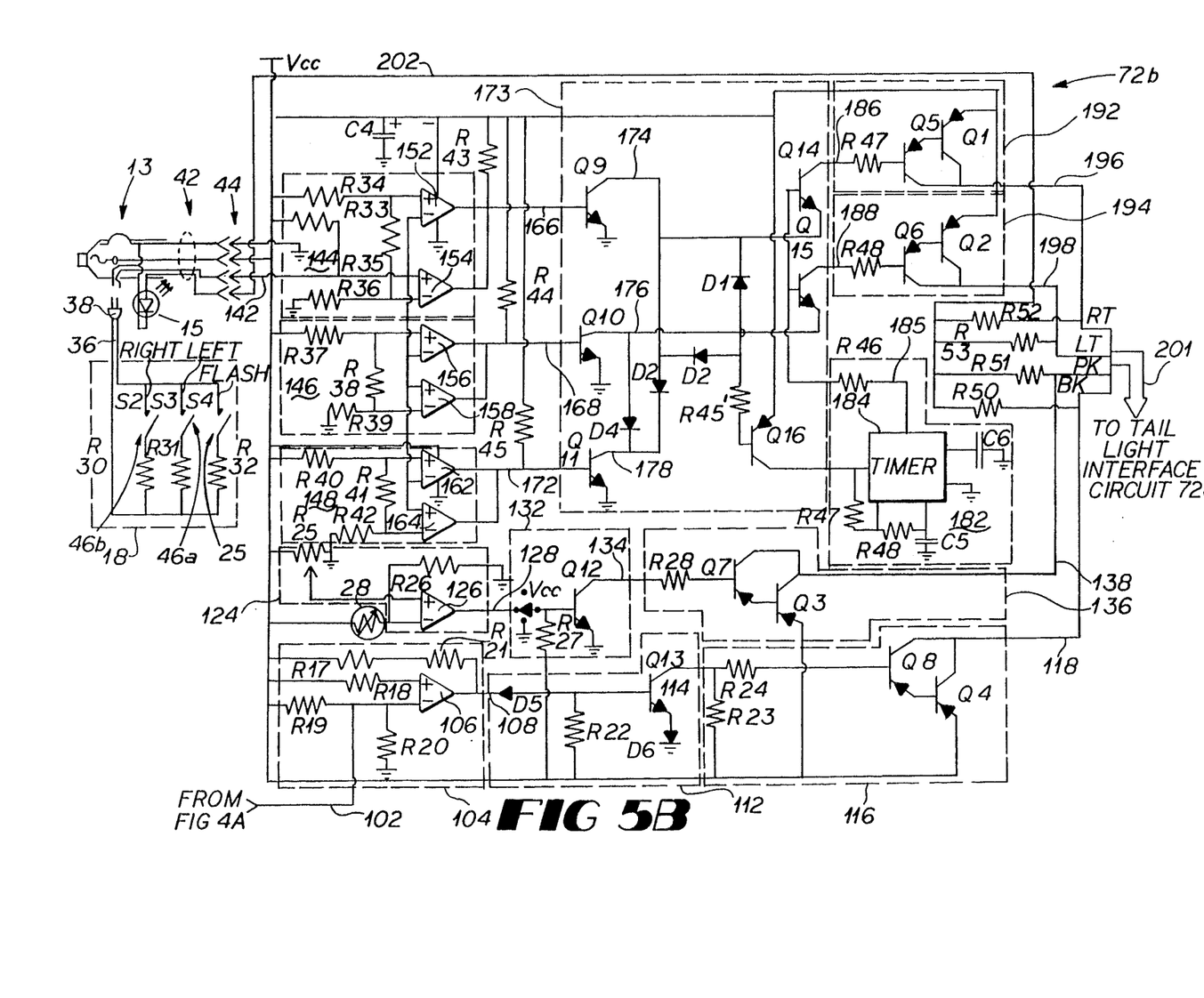
FIG. 5B is a low level circuit diagram of a turn signal detector circuit, a control unit processing circuit, and a light sensing switch circuit of FIG. 5.
Figure 5C:
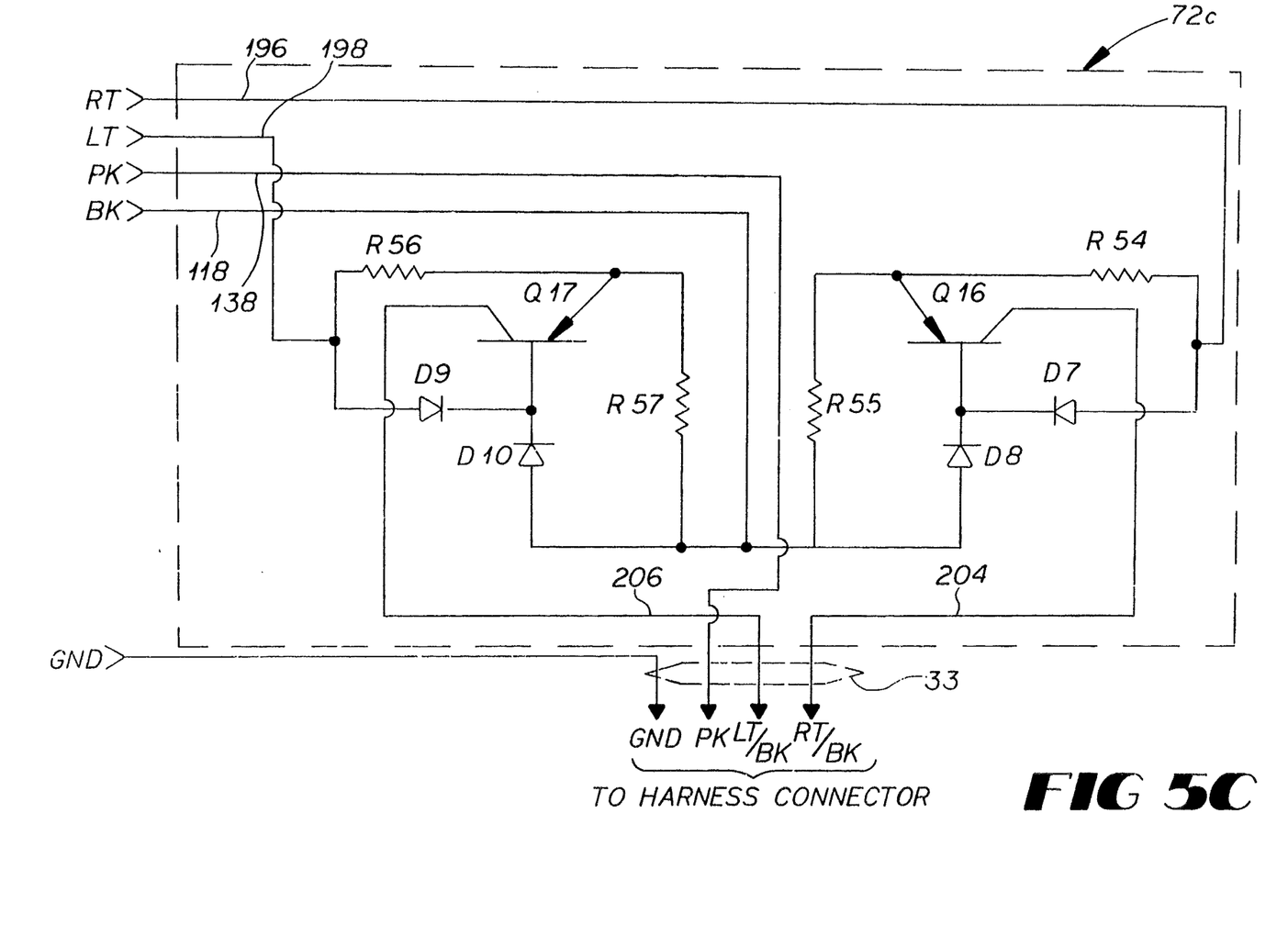
FIG. 5C is a low level circuit diagram of a tail light interface circuit of FIG. 5.

A high level circuit diagram showing the internal monitoring and processing circuits 72 of the control unit 24 is shown in FIG. 5. For purposes of discussion and clarity in understanding, FIG. 5 has been broken down into low level circuit diagrams in FIGS. 5A through 5C. FIG. 5A is a low level circuit diagram of the brake detector circuit 72a of FIG. 5. FIG. 5B is a low level circuit diagram of the turn signal detector circuit 18, a control unit processing circuit 19, and a light sensing circuit 28 of FIG. 5. Finally, FIG. 5C is a low level circuit diagram of a tail light interface circuit 72c of FIG. 5.

The brake detector circuit 72a for the inertia sensor 56 is now discussed relative to FIG. 5A. The brake detector circuit 72a resides within the housing 26 of the control unit 24 associated with the inertia sensor 56. With reference to FIG. 5A, the inertia sensor 56 is illustrated as a variable resistor R2. The carbon semiconductor track 64a is biased by a suitable voltage from a resistor R1 connected to the supply voltage $V_{cc}$, preferably the vehicle battery voltage, or 12 volts DC.

An amplifier 74 is disposed to monitor the voltage change across the variable resistor R1. If the variable resistor R1 has a high enough resistance range, for example, a range greater than about 1,000 ohms, then the amplifier 74 may be eliminated from the brake detector circuit 72a because a sufficient detectable voltage change can be measured across the variable resistor R1.

Amplifier 74 comprises resistor R3–R5 and a conventional operational amplifier (OP-AMP) 76 biased by the supply voltage $V_{cc}$, as shown in FIG. 5A. The amplifier 74 outputs a ramp voltage function having either a positive or a negative slope at amplifier output 78.

A differentiator 82 receives the amplifier output 78 and differentiates the ramp voltage function to generate either a positive or a negative pulse corresponding respectively with a positive or negative slope of the ramp voltage function. The differentiator 82 comprises resistors R6–R9, capacitors C1, C2, and a conventional OP-AMP 84 biased by the supply voltage $V_{cc}$. The differentiator 82 can be selectively adjusted so that the brake detector circuit 72a responds only to fast changes in the variable brake resistance R1. This is accomplished by adjusting the capacitance value of capacitor.

The differentiator output 86 of the differentiator 82 is communicated to both a positive comparator 88a and a negative comparator 88b for determining respectively whether a positive or negative pulse, if any, is being generated by the differentiator 82. The positive comparator 88a has an adjustable positive reference voltage at the noninverting input of a conventional OP-AMP 92 biased by the supply voltage $V_{cc}$. The adjustable positive reference voltage is selectively varied via a variable resistor R10. Similarly, the negative comparator 88b comprises an adjustable negative reference voltage at the inverting terminal of a conventional OP-AMP 94 biased by the supply voltage $V_{cc}$. Further, the adjustable negative reference voltage is selectively varied via a variable resistor R11.

In order to filter out changes in the variable brake resistance R1 which are not attributable to braking occurrences, i.e., false readings, the capacitor C2 and resisters R10, R11 (adjustable positive, negative reference voltages, respectively) are adjusted so that the brake detector circuit 72a will respond only to resistance changes above a predetermined value. Essentially, a resistance change must be of a particular magnitude, as determined by the resistors R10, R11 within a specified time period, as determined by capacitor C2.

The comparator outputs 96a, 96b of the respective comparators 88a, 88b are communicated to respective voltage amplifiers 98a, 98b biased by the supply voltage $V_{cc}$. The voltage amplifier 98a comprises successive amplifier stages R12, Q0 and R13, Q0', R14. The one-stage voltage amplifier 98b comprises successive elements R15, Q0'', R16.

The respective outputs of the voltage amplifiers 98a, 98b are connected together, as shown in FIG. 5A, to derive a brake detector output 102. The brake detector output 102 exhibits either a logic high (logically, "1"), or 12 volts, indicative of a braking occurrence, or alternatively, a logic low (logically, "0"), or approximately 0–0.3 volts, indicative of the absence of a braking occurrence.

FIG. 5B is a low level circuit diagram of the turn signal detector circuit 18, the control unit processing circuit 19, and the light sensing circuit 28. As illustrated in FIG. 5B, the brake detector output 102 from FIG. 5A is fed to a comparator 104, comprising resistors R17–R20 and OP-AMP 106. In the comparator 104, the brake detector output 102 is compared to a positive reference voltage in order to determine whether the brake detector output 102 exhibits either a logic high or a logic low. If a logic high is detected on the brake detector output 102, then the comparator 104 outputs a logic high at the comparator output 108. The comparator output 108 is fed to a latch 112, comprised of diodes D5, D6, resistor R22, and transistor Q13. Thus, in the latching mode, the collector output 114 is pulled to a logic low to thereby actuate transistors Q8, Q4 within a current amplifier comprising resistors R23, R24 and the transistors Q8, Q4. When a logic high is recognized on the brake detector output 102, the current amplifier 116 provides a logic low at a current amplifier output 118 (BK line) to thereby actuate brake lights on the second vehicle 12. In the preferred embodiment, the amplifier output 118 is connected to a tail light interface circuit 72c, which is described in detail later hereinafter in regard to FIG. 5C.

As further illustrated in FIG. 5B, the light sensing switch 28 is indicated schematically. The light sensing switch 28 senses light to determine whether park lights on the second vehicle 12 are to be illuminated.

The light sensing switch 28 is connected between a supply voltage $V_{cc}$ and the input of a comparator 124. The light sensing switch 28 may comprise a photocell or other light sensing element for sensing the absence of atmospheric light. The comparator 124 comprises a conventional configuration with an OP-AMP 126 biased by the supply voltage $V_{cc}$, a variable resistor R25 for selectively varying the reference voltage, and a biasing resistor R26. A comparator output 128 of the comparator 124 is fed to a switching mechanism 132. The switching mechanism 132 comprises a selector switch S1, a transistor Q12, and a biasing resistor R27 for the transistor Q12. The selector switch S1 enables the light sensing switch 28 to be overridden, if desired. More specifically, when the selector switch S1 is connected to the supply voltage $V_{cc}$, the transistor Q12 is manually turned on to thereby actuate subsequent circuitry for indicating a braking occurrence. When the selector switch S1 is connected to ground, then the transistor Q12 is manually turned off and the switching mechanism 132 will indicate to subsequent circuitry that no braking has occurred. Finally, when the selector switch S1 is connected to the comparator output 128 of the comparator 124, then the transistor Q12 and generally the switching mechanism 132 are controlled automatically by the light sensing switch 128.

A switching mechanism output 134 is fed to a current amplifier 136 comprising an input resistor R28 and cascaded amplification transistors Q7, Q3 in order to derive a current amplifier output 138 (PK line) which is fed to the tail light interface circuit 72c. Thus, when the light sensing switch 28 and/or the switching mechanism 132 requires that the park lights are to be illuminated on the second vehicle, the amplifier output 138 is pulled to a logic low.

The turn signal detector 18 is also shown schematically in FIG. 5B. The turn signal detector 18 has a variable resistance which is monitored in order to determine whether a right turn signal or a left turn signal or flashers have been actuated in the first vehicle 11. The variable resistance is implemented by an internal resistive network having three electrical branches, one for each of the foregoing functions. A right turn signal branch comprises switch S2 connected in electrical series with a resistor R30. Switch S2 corresponds with the rocker arm switch 46b of FIGS. 2A, 2B. A left turn signal branch has a switch S3 connected in electrical series with a resistor R31. The switch S3 corresponds with the switch 46a of FIGS. 2A, 2B. Finally, a flasher signal branch has a switch S4 connected in electrical series with a resistor R32. The switch S4 corresponds with the flasher switch 25 of FIGS. 1, 2A, 2B. Only one of the switches S2 and S3 is actuated at a particular instance in time. Moreover, S4 can be turned on concurrently with either of switches S2 or S3.

When the turn signal lever arm 22 is moved to actuate a right turn signal in the first vehicle 11, the switch S2 is closed and a first voltage $V_1 = V_{cc} \times (R33/(R30+R33))$ is exhibited at the input node 142. Moreover, when the turn signal lever arm 22 is moved to actuate a left turn signal in the first vehicle 11, the switch S3 is closed and a second voltage $V_2 = V_{cc} \times (R33/(R31+R33))$, where $V_2 > V_1$, appears at the input node 142. Finally, when a flasher signal is actuated in the first vehicle 11, the switch S4 is closed and a third voltage $V_3 = V_{cc} \times (R33/(R32+R33))$, where $V_3 > V_2 > V_1$, appears at the input node 142.

The input voltage on the input node 142 is multiplexed to three comparators 144, 146, 148 within the control unit 124. The three comparators 144, 146, 148 are dedicated to detecting the voltages $V_1$, $V_2$, $V_3$, respectively. More specifically, the comparator 144, comprised of OP-AMPs 152, 154 and resistors R34–R36, R43 is dedicated to detecting a right turn signal and hence the corresponding voltage $V_1$ on the input node 142. In fact, the comparator 144 considers a voltage range, where $V_1$ is preferably situated in the center of the voltage range. OP-AMP 152 sets the lower threshold of the voltage range, while OP-AMP 154 sets the upper threshold of the voltage range. The foregoing voltage range enhances the accuracy of the system. Moreover, the other comparators 146, 148 have similar architectures for considering mutually exclusive voltage ranges surrounding their respective target voltage.

Furthermore, the comparator 146, comprised of OP-AMPs 156, 158 and resistors R37–R39, R44 is dedicated to detecting a left turn signal and hence the corresponding voltage $V_2$ on the input node 142. Finally, the comparator 148, comprised of dual OP-AMPs 162, 164 and resistors R40–R42, R45 is dedicated to detecting a flasher signal and hence the corresponding voltage $V_3$ on input node 142.

The comparator outputs 166, 168, 172 are fed to respective switching transistors Q9, Q10, Q11 corresponding respectively with the right turn signal, the left turn signal, and the flasher signal of a logic network 173. Transistor outputs 174, 176, 178 from the respective transistors Q9, Q10, Q11 are next operated on by a logic function comprising diodes D1–D4 so that the outputs 174, 176, 178 can share the same timer and driving circuitry. In essence, the diodes D1–D4 ensure that if either the right turn signal or left turn signal is turned on while the flasher signal is turned on, then the flasher signal dominates.

The transistor outputs 174, 176, 178 operate switching transistor Q16 via R45' to thereby initiate a timing circuit 182. The timing circuit 182 preferably has a conventional 555 timer with associated circuitry, specifically, resistors R46–R48 and capacitors C5, C6. The timing circuit 182 provides a timing circuit output 185 which repetitively switches logic states, or strobes, so that the switching transistors Q14, Q15 are repetitively switched on and off, or strobed.

The switching transistors Q14, Q15 operate as follows. When a right turn signal is detected by the turn signal detector circuit 18, only the transistor Q14 is periodically actuated, or strobed. When the left turn signal is detected, then only the transistor Q15 is periodically actuated, or strobed. Further, when the flasher signal is detected, then both the transistors Q14, Q15 are concurrently periodically actuated, or strobed.

Transistor outputs 186, 188 from respective transistors Q14, Q15 pass through respective current amplifiers 192, 194. Each of the current amplifiers 192, 194 comprises a respective input resistance R47, R48 and a respective cascaded transistor arrangement Q5, Q1 and Q6, Q2.

The current amplifier output 196 (RT line), which is indicative of the right turn signal, and the current amplifier output 198 (LT line), which is indicative of the left turn signal, are both connected to the tail light interface circuit 72c (FIG. 5C).

Another feature of the circuit 72b of FIG. 5B is the connection of the indicator 15 to each of the outputs 118, 138, 196, 198, indicative of respectively the brake signal, the park light signal, the right turn signal, and the left turn signal via respective resistors R50-R53 for limiting the power through the low power indicator 15.

The tail light interface circuit 72c is illustrated schematically in FIG. 5C. Essentially, the tail light interface circuit 72c has logic for combining the brake function with both the right and left blinker function so that both functions share the same two wires or connections. This is generally the required implementation in many conventional harness connectors, for example, the four-way flat connector 32 which has the following pin arrangement: right turn signal/brake (RT/BK), left turn signal/brake (LT/BK), park lights (PK), and ground (GND).

With reference to FIG. 5C, the right turn signal on line 198 is fed to a circuit network comprising resistors R54, R55, a transistor Q16, and diodes D7, D8. When the right turn signal on line 196 exhibits a logic high, while the brake signal on line 118 exhibits a logic low, the RT/BK output signal 204 will be permitted to strobe, thereby indicating a right turn signal in the second vehicle 12. If, however, the brake signal on line 118 exhibits a logic high, then the RT/BK output signal 204 will remain at a logic high, thereby indicating a brake signal in the second vehicle 12 by continuously illuminating the right turn signal light of the second vehicle 12.

Similarly, the left turn signal on line 198 is fed to a circuit network comprising resistors R56, R57, a transistor Q17, and diodes D9, D10. If the left turn signal on line 198 exhibits a logic high while the brake signal on line 118 exhibits a logic low, then the LT/BK output signal 206 will be permitted to strobe, thereby indicating a left turn signal in the second vehicle 12. If, however, the brake signal on line 118 exhibits a logic high, then the LT/BK and RT/BK output signals 206, 204 will remain at a logic high to thereby indicate a brake signal by continuously illuminating the right turn signal light on the second vehicle 12.

As further shown in FIG. 5C, the park light signal on line 138 passes through the tail light interface circuit 72c without further processing. Finally, the harness connector 32 obtains a ground signal from the power interface 13 via the control unit 24, which obtains ground from the power interface 13.

It will be obvious to those skilled in the art that many variations and modifications may be made to the above-described embodiments, which were chosen for the purpose of illustrating the present invention, without substantially departing from the spirit and scope of the present invention. Accordingly, all such variations and modifications are intended to be included herein within the scope of the following claims.

Wherefore, the inventor claims the following:

1. An interface system utilizing an inertia sensor for actuating a vehicle light said inertia sensor comprising:
   at least two conductive surfaces;
   a mobile conductive mass against and electrically connecting said surfaces and capable of moving along said surfaces in response to inertia;
   processing means connected to said inertia sensor for monitoring resistance between said surfaces, to thereby determine or perform actuation of said light upon a predetermined change in said resistance.

2. The interface system of claim 1, further comprising:
   a light sensing means for receiving light connected to said processing means for actuating park lights of said second vehicle during the absence of said light;
   a turn signal detector means connected to said processing means for detecting an actuation of a turn signal light on said first vehicle for actuating a corresponding turn signal light on said second vehicle in response to said actuation.

3. The inertia sensor of claim 1, wherein said mobile conductive mass rides upon an arcuate surface.

4. The interface system of claim 1, further comprising a power interface means connected to said processing means for interfacing with electrical power available at said first vehicle.

5. The interface system of claim 2, wherein said turn signal detector means comprises a mounting means for releasably engaging said turn signal detector means to a turn signal lever arm of said first vehicle and a means for determining the turn signal orientation of said turn signal lever arm.

6. The interface system of claim 1, wherein said first vehicle tows said second vehicle.

7. The interface system of claim 1, wherein said conductive surfaces comprises a first surface made of semiconductor material and a second surface made of conductor material.

8. The interface system of claim 4, wherein said interface means connects to a cigarette lighter socket and further comprises an indicator configured to indicate operation of a light of said second vehicle.

9. An inertia sensor for detecting actuation of brakes on a vehicle, comprising:
   at least two conductive surfaces:
   a mobile conductive mass against and electrically connecting said surfaces and capable of moving along said surfaces in response to inertia;
   processing means for monitoring resistance between said surfaces, said processing means for performing said actuation of said brakes upon a predetermined change in said resistance.

10. The inertia sensor of claim 9, wherein said processing means comprises a differentiator for receiving a voltage signal imposed across said resistance and a comparator for receiving a pulse from said differentiator.

11. The inertia sensor of claim 9, wherein said conductive surfaces are encapsulated within a substantially sealed housing.

12. The inertia sensor of claim 9, wherein said surfaces comprise a semiconductor surface and a conductor surface.

13. A method for detecting actuation of brakes by monitoring inertia of a vehicle utilizing an inertia sensor, the sensor comprising:
   providing at least a pair of conductive surfaces;
   riding a mobile conductive material mass against said surfaces by force of gravity, said mobile conductive mass rides upon an arcuate surface;
   a processing means connected to said inertia sensor monitoring resistance between said rails to thereby determine said actuation of said brakes upon a predetermined change in said resistance.

14. An inertia sensor for coordinating vehicle brake response on a first vehicle with vehicle brake response on a second vehicle comprising:

at least two conductive surfaces:
a mobile conductive mass against and electrically connecting said surfaces in response to inertia:
processing means connected to said inertia sensor for monitoring resistance between said surfaces to thereby determine or perform actuation of brakes on said second vehicle upon a predetermined change in said resistance occurring in response to actuation of brakes of said first vehicle.

* * * * *